US011496296B2

(12) United States Patent
Hegai et al.

(10) Patent No.: US 11,496,296 B2
(45) Date of Patent: Nov. 8, 2022

(54) METHOD OF AUTHENTICATION FOR DELIVERY OF A PRODUCT

(71) Applicant: Robert Bosch GmbH, Stuttgart (DE)

(72) Inventors: Alexander Hegai, Stuttgart (DE); Jens Breitbart, Wildeck (DE)

(73) Assignee: Robert Bosch GmbH, Stuttgart (DE)

(*) Notice: Subject to any disclaimer, the term of this patent is extended or adjusted under 35 U.S.C. 154(b) by 31 days.

(21) Appl. No.: 17/172,426

(22) Filed: Feb. 10, 2021

(65) Prior Publication Data

US 2021/0273788 A1 Sep. 2, 2021

(30) Foreign Application Priority Data

Feb. 28, 2020 (DE) .......................... 102020202594.0

(51) Int. Cl.
| | |
|---|---|
| *H04L 29/06* | (2006.01) |
| *H04L 9/08* | (2006.01) |
| *H04L 9/32* | (2006.01) |
| *G06Q 10/08* | (2012.01) |
| *H04L 9/14* | (2006.01) |

(52) U.S. Cl.
CPC .......... *H04L 9/0825* (2013.01); *G06Q 10/08* (2013.01); *H04L 9/14* (2013.01); *H04L 9/3236* (2013.01); *H04L 2209/80* (2013.01)

(58) Field of Classification Search
CPC ....... H04L 9/0825; H04L 9/14; H04L 9/3236; H04L 2209/80; G06Q 10/08
See application file for complete search history.

(56) References Cited

U.S. PATENT DOCUMENTS

| | | | | |
|---|---|---|---|---|
| 6,076,078 A | * | 6/2000 | Camp ................... | G06Q 20/085 705/76 |
| 6,678,821 B1 | * | 1/2004 | Waugh .................. | H04L 9/3231 380/278 |
| 8,924,308 B1 | * | 12/2014 | Mehta ................ | G06Q 20/3829 705/64 |
| 11,321,689 B2 | * | 5/2022 | Scholl ................ | G06Q 20/3674 |
| 2005/0180564 A1 | * | 8/2005 | Asano ..................... | G06F 21/84 380/28 |
| 2008/0123862 A1 | | 5/2008 | Rowley | |
| 2009/0006850 A1 | | 1/2009 | Birger et al. | |
| 2015/0134552 A1 | | 5/2015 | Engels et al. | |

(Continued)

FOREIGN PATENT DOCUMENTS

| | | | | |
|---|---|---|---|---|
| CA | 2352325 A1 | * | 11/1999 | ............. G06F 12/14 |
| CA | 2587155 A1 | * | 11/2007 | ........... G06F 21/606 |
| EP | 3410410 A1 | | 12/2018 | |

*Primary Examiner* — Shawnchoy Rahman
(74) *Attorney, Agent, or Firm* — Norton Rose Fulbright US LLP; Gerard Messina

(57) ABSTRACT

A method of authentication for delivery of a product to a recipient. The method includes: a customer generating a public and a private cryptographic key in accordance with an asymmetrical encryption; the customer providing the public cryptographic key for the deliverer; the deliverer generating a message encrypted using the public cryptographic key; transmitting the encrypted message to the recipient for authentication; generating a plain text of the encrypted message in that the recipient decrypts the encrypted message using the private key; transmitting the plain text to the deliverer; and the deliverer authenticating the recipient if the transmitted plain text matches the message.

14 Claims, 1 Drawing Sheet

(56) References Cited

U.S. PATENT DOCUMENTS

| 2017/0091699 A1* | 3/2017 | Mueller | H04W 4/023 |
| 2017/0180136 A1* | 6/2017 | Ibasco | G06Q 20/4012 |
| 2021/0226933 A1* | 7/2021 | Puzeris | H04L 63/18 |
| 2021/0377046 A1* | 12/2021 | Fries | G06F 21/64 |

* cited by examiner

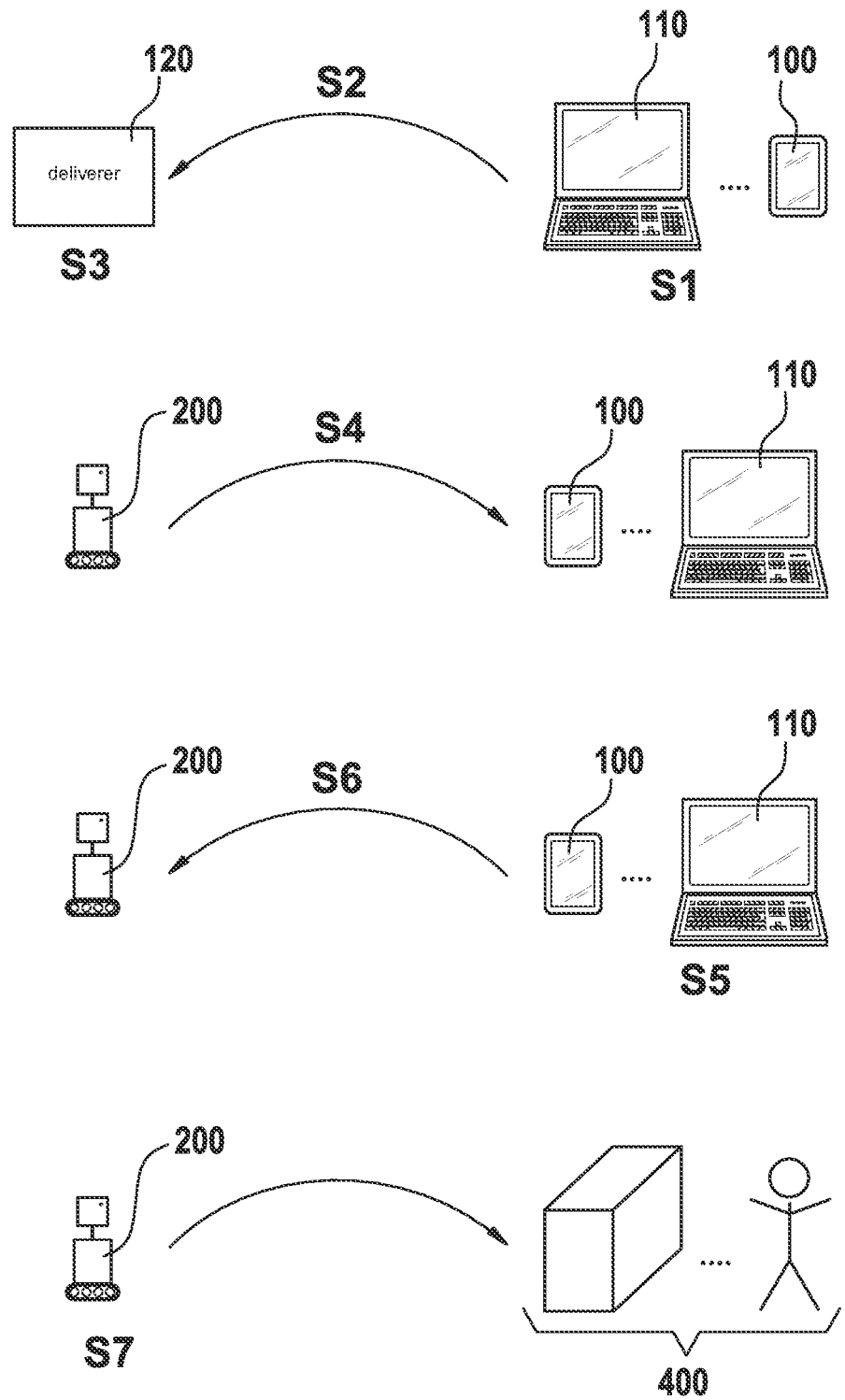

METHOD OF AUTHENTICATION FOR DELIVERY OF A PRODUCT

CROSS REFERENCE

The present application claims the benefit under 35 U.S.C. § 119 of German Patent Application No. DE 102020202594.0 filed on Feb. 28, 2020, which is expressly incorporated herein by reference in its entirety.

FIELD

The present invention relates to a method of authentication for delivery of a product in particular using an at least partially automated mobile platform.

BACKGROUND INFORMATION

When delivering products to a recipient, the deliverer must check, prior to handing over the product, whether a person is legitimate recipient for the product to be delivered. If the delivery is accompanied or performed by persons, a recipient is able to identify himself as legitimate for example by presenting identification papers.

Due to increasing online commerce, an ever increasing quantity of products must be delivered. In order to reduce the personnel requirement for the delivery, automated delivery, in particular using drones, is currently being tested.

SUMMARY

In such an automated delivery, it is often necessary to check not only the delivery location or the delivery address, but also the right of a recipient to receive the product.

In this context, a legitimate recipient may be a person as well as a mailbox in the broadest sense.

If the delivery is performed by partially automated, fully automated or autonomous systems, there is the problem of authenticating the respective legitimate recipient in a secure, quick and simple manner. For this purpose, the greatest possible variety of different authentication tasks should be covered by a unified method, which allows for example for products to be received by persons or receiving stations that were in particular possibly not yet known at the time of the online order.

According to the present invention, a method is provided for the authentication for a delivery of a product to a recipient as well as the use of this method. Advantageous developments and embodiments of the present invention are described herein.

The present invention is based on the recognition that through a distributed exchange of messages and encrypted messages between an at least partially automated deliverer and a legitimate recipient, the recipient is able to authenticate himself by way of a text encrypted by data processing systems.

In this entire description of the present invention, the sequence of method steps is presented in such a way that it is easy to follow the method. One skilled in the art will recognize, however, that many method step may also be run through in a different order and yield the same or a corresponding result. In this sense, it is possible to change the order of the method steps accordingly. Some features are provided with numerals in order to improve readability or to make the association more clear, but this does not imply an existence of specific features.

In accordance with an example embodiment of the present invention, a method of authentication for delivery of a product to a recipient is provided having the following steps. In a first step, a customer generates a public and a private cryptographic key in accordance with an asymmetrical encryption. In a further step, the customer provides the public cryptographic key for the deliverer. In a further step, the deliverer generates an encrypted message using the public cryptographic key. In a further step, the encrypted message is transmitted to the recipient for authentication. In a further step, the recipient generates a plain text of the encrypted message by decrypting the encrypted message using the private key. In a further step, the plain text is transmitted to the deliverer. In a further step, the deliverer authenticates the recipient if the provided plain text matches the message.

For this purpose, authentication means that it is verified that a recipient is authorized legitimately to receive products in a delivery.

In an asymmetrical method for encrypting texts, a public and a private cryptographic key are generated, it being possible to make the public cryptographic key known without it thereby being possible to infer the private cryptographic key. Hence, no secrecy is required when distributing the public cryptographic key.

In accordance with the example method, a recipient may be a person as well as an at least partially automated platform or an automated receiving station. Furthermore, the deliverer may be an at least partially automated platform, such as for example a robot or a drone, or a person, which performs for example with an automated receiving station an authentication of the automated receiving station.

The message may be a plain text, which is any kind of text, such as for example an invoice or a product description, but the message may also contain in particular a hash value or a random number. The latter may render a corruption of the authentication more difficult.

The product to be delivered may be a physical object or a non-physical object.

The concept of generating the public and the private cryptographic key is to be understood broadly and comprises both a computing of a public and of a private cryptographic key as well as the case in which a previously generated public and private cryptographic key, which the customer has stored, is used for this method. The deliverer may also be vendor of a product, which is offered for sale via the Internet and was selected or purchased by the customer.

The customer may be identical with the recipient or may be distinct from the recipient. The method may also be used, however, if the customer makes a purchase in a retail store, where the product is to be delivered later.

This method makes it possible to perform an authentication between an automated deliverer and a person as well as between an automated deliverer and an automated receiving station in a simple and quick manner without requiring a material exchange of identification papers or tokens or similar items for authentication. Furthermore, using the asymmetrical encryption in the form of a public key cryptography also makes it possible, even after an order was placed, to authorize a recipient vis-a-vis the deliverer to receive the corresponding product in a delivery.

It is furthermore advantageous that the required public and private keys may be generated simply using a stationary data processing system such as a computer, which is connected to the Internet, or by a mobile data processing device, such as a smart phone for example, and that these keys may be transmitted in a simple manner by wireless communication methods.

Using the example method, access to the Internet is required only once in a typical ordering process since the authentication between deliverer and recipient is possible directly via any wireless communication method.

It is furthermore advantageous that using this method the authentication does not depend on a predetermined delivery location, as the latter may be changed without having to change the authentication.

According to one aspect, the present invention provides for the deliverer to be a first at least partially automated mobile platform.

A mobile platform may be understood as an at least partially automated system, which is mobile, and/or a driver assistance system of a vehicle. One example may be an at least partially automated vehicle or a vehicle comprising a driver assistance system. That is to say that in this context, an at least partially automated system comprises a mobile platform with respect to an at least partially automated functionality, but the term mobile platform comprises also vehicles and other mobile machines including driver assistance systems. Further example of mobile platforms may be driver assistance systems having multiple sensors, mobile multi-sensor robots such as a drone for example, an automated transfer system or a self-driving system. Each of these systems may be a completely or partially automated system.

In particular, the public key may be contained in a product shipment which is to deliver the product to a recipient. Before the product is handed over to the recipient, the first at least partially automated mobile platform, for example in the form of a robot, is able to authenticate the recipient on the basis of the public key.

In other words, the authentication may be performed via the message that is encrypted by the public key and is transmitted to the recipient. This encrypted message is decrypted by the legitimate recipient using the private key and is returned to the at least partially automated mobile platform or to the robot. The fact that the encrypted message can only be decrypted using the private key ensures that the message was received by the person who ordered the product or by a person who has access to the private key. It is necessary that the private key is kept private and may only be seen by a trustworthy person who is permitted to receive the package, that is, by a legitimate recipient.

Since only the public key is required for the purpose of ordering, it is possible to order products for third parties. As already mentioned, the entire process does not necessarily require a human interaction, and the actions of both parties of the delivery may be carried out entirely automatically, e.g., at an automated logistics hub.

According to one aspect, the present invention provides for the recipient to be a person or an automated receiving station.

An automated receiving station is a device in which products may be deposited and to which then only authorized persons have access in order either to deposit products or to retrieve products. This receiving station is automated in the sense that access to this receiving station is authorized in automated fashion in that the product is on the one hand mechanically protected against unauthorized access and in that on the other hand the authorization of an access is verified in automated fashion.

The method may be used for example in an automated logistics center or a logistics hub.

In such a case, the products delivered by an autonomous cargo truck could only be received by the hub designated for it, unless the cargo truck is forcibly opened or the cryptography is broken. This method may advantageously also be used for end customers in a supply chain, who are having the product delivered to such an automated receiving station. Such an automated receiving station may be used by a plurality of recipients or may be assigned to a specific recipient.

According to one aspect, the present invention provides for the authentication to occur in fully automatic fashion between a first at least partially automated mobile platform as the deliverer and a second at least partially automated platform as the recipient.

In this form, the method may be used to build up an automated logistics chain in that automated vehicles deliver products to one another and transport these further.

According to one aspect, the present invention provides for the recipient to monitor the deliverer at a delivery location by remote transmission in order to perform the authentication.

Such a remote transmission may be a transmission of images, for example via a video camera, whereby a recipient is able to monitor the delivery.

For example, a delivery robot streams a video that shows that a package was placed at the front door. This allows for an authentication in a delivery over great distances.

According to one aspect, the present invention provides for the transmission of the encrypted message and/or of the plain text to occur via a wireless communication method.

Due to the fact that in this method the encrypted message may be transmitted using any wireless method, no Internet access is required for the authentication. Thus it is possible for the handover to occur even in places where there is no Internet access, and all information may be exchanged locally. Examples of such wireless communication methods are Bluetooth, NFC or optical transmission, for example via a QR code.

According to one aspect, the present invention provides for the message to be a hash value and/or a random value.

In this manner, the method for authenticating a receiver may be made more secure against an unauthorized attack on the delivery or the authentication. This is advantageous in particular if the delivery occurs between two automated systems.

Decrypted, such a random value or hash value may look as follows: "e8c6a1801a92a72b2713482971f37f9d7b0a9-efb4c92d05dfd9b20d278788950e1d37b3cfba03cbfbb046-8ce27cf41c2bf0a657cbf4ab3cea5c282ccff5bae0 6"

According to one aspect, the present invention provides for the transmission of the encrypted message to occur prior to a handover of the product to the recipient.

This method for authentication in the delivery thus makes it possible to ensure that the product is handed over only if the recipient is actually entitled or was authorized to receive the product.

According to one aspect, the present invention provides for the public key and the private key to be generated with the aid of a data processing system.

Using a data processing system, such as a computer for example, makes it possible to ensure an appropriate security level when creating or generating the public and the private key. Alternatively, it is also possible to use a mobile data processing device, such as a smart phone for example, to generate the public and the private key.

According to one aspect, the present invention provides for the plain text of the encrypted message to be generated with the aid of a mobile data processing device.

This yields the advantage that the authorization of the delivery may be performed at any location in mobile fashion.

According to one aspect, the present invention provides for a method for asymmetrical encryption to be negotiated between the customer and the deliverer.

This makes it possible to adapt the utilized method to the possibilities of the utilized data processing systems or mobile data processing device or a security level of the utilized cryptographic method.

Furthermore, it is also possible for the form of the transmissions of the encrypted message or the plain text to be negotiated between the customer and the deliverer. In this context, the term negotiating is to be understood in the sense that an exchange occurs between the customer and the deliverer regarding the respective method, for example in that the customer selects a method from a list provided by the deliverer.

According to one aspect, the present invention provides that for authentication a plurality of different public keys is transmitted to the deliverer and that the authentication occurs by way of an encrypted message that was encrypted using one of this plurality of public keys.

This makes it possible, during an ordering process, additionally to authorize multiple recipients, such as family members or neighbors of the customer for example, that the product will be delivered to them. Using this method, it is also possible to order products for third parties or accordingly to delegate the reception of a product by exchanging the private key.

According to one aspect, the present invention provides for the asymmetrical encryption to be generated at an equivalent security level of a 128 bit symmetrical key length.

A secure symmetrical method is subject to the requirement that there cannot be an attack that is quicker than trying out all keys. A secure key length for symmetrical methods is today considered to be at least 128 bits.

It should be considered, however, that the assessment of such a "secure" key length may change sooner or later due to fundamentally better mathematical method or significantly faster computers possible in the future.

In asymmetrical "public key methods," the security level is not equal to the key length, but significantly less. Furthermore, there are conventional methods that are significantly faster than trying out all keys. These methods must be taken into consideration for assessing the equivalent security level.

For example, the public or private key may be generated using the Ed25519 method, i.e., the Edwards curve Digital Signature Algorithm (EdDSA) in combination with SHA-512 (SHA-2) and the elliptical curve Curve25519.

An example for a private key:
b3B1bnNzaClrZXktdjEAAAAABG5vbmUAAAAEbm
9uZQ BAAAAMwAAAAtz c2gtZW
QyNTUxOQAAACDmTGPrG7dYi51v6aW1QgfubRD+
0LgNyoxW+2dXLSUV1QAAAJjm/m WV5v51
1QAA AAtzc2gtZWQyNTUxOQAAACDmTGPrG7dYi51
v6aW1QgfubRD+0LgNyoxW+2dX LSUV1Q
AAAEC3zi8NpBNGo9vET/
LwvdckXXAu964J2QjEH5ZENHZUCuZMY+sbtliLnW/
ppb VCB+5t
EP7QuA3KjFb7Z1ctJRWVAAAAEHJiajJhYnRAQUJU
WjBGVEUBAgMEBQ==

And this is an example of a public key:
ssh-ed25519
AAAAC3NzaC11ZDI1NTE5AAAAIOZMY+sbtliLnW/
ppbVCB+5tEP7QuA3KjFb7Z1ct JRWV A use of the method for authentication as described above is provided, which is performed prior to delivery of a product using an at least partially automated platform.

This makes it possible to ensure that the product can only be handed over to an authorized recipient.

BRIEF DESCRIPTION OF THE DRAWING

Exemplary embodiments of the present invention are presented with reference to FIG. 1 and explained in greater detail below.

FIG. 1 shows steps of a method for authenticating a recipient for delivery of a product.

DETAILED DESCRIPTION OF EXAMPLE EMBODIMENTS

FIG. 1 delineates the method for authenticating a recipient 400 for delivery of a product, wherein, in a first step S1, a public and a private cryptographic key, in accordance with an asymmetrical encryption, is generated by a customer with the aid of a mobile data processing device or a data processing system. The customer may be identical with the recipient 400 of the product and may use a mobile data processing device 100 or a data processing system 110 of the recipient for generating the cryptographic key.

The cryptographic method used for generating the public and the private cryptographic key may be negotiated or selected in advance between the customer and the deliverer 120, 200.

In a second step S2, the customer provides the public cryptographic key for the deliverer 120, 200, for example via an Internet connection or a wireless communication method to a data processing device of the deliverer 120, 200. This public cryptographic key may be associated with one or multiple recipients 400.

Alternatively or additionally, a plurality of public cryptographic keys may be transmitted to the deliverer 120, 200, which is associated with a plurality of recipients.

In a third step S3, the deliverer 120, 200 uses the provided public cryptographic key to generate an encrypted message, for example with the aid of a data processing device or alternatively or additionally by way of an at least partially automated platform 200 of the deliverer 120. For this purpose, the data processing device of the deliverer 120 can provide the public key to the mobile platform 200 of the deliverer 120. Alternatively, the deliverer 120 may provide to the at least partially automated mobile platform 200 of the deliverer 120 both a message encrypted using the public key as well as the plain text of the encrypted message. Alternatively or additionally, the at least partially automated mobile platform 200 itself may be the deliverer 120, to whom the public key of the customer is transmitted.

In a further step S4, the message encrypted using the public key of the customer is transmitted via a wireless communication method to data processing system 110 or mobile data processing device 100 of the recipient 400 for the authentication.

If a plurality of public cryptographic keys were transmitted to deliverer 120, 200, it is also possible to generate and transmit a corresponding plurality of encrypted messages to recipient 400.

In a further step S5, the recipient 400 generates a plain text of the encrypted message by decrypting the encrypted message using the private key. For this purpose, recipient 400 may use for example mobile data processing device 100 or data processing system 110.

In the exemplary embodiment described here, recipient 400 is a person, who uses for example a smart phone, as an example of a mobile data processing device 100, in order to generate the plain text. Alternatively, recipient 400 may also be a fully automated receiving station 400 or a second at least partially automated mobile platform 400, which communicates with deliverer 120, 200, via a wireless communication method such as Bluetooth or NFC for example.

In a sixth step S6, the plain text is transmitted from recipient 400 to deliverer 120, 200, which may be for example an at least partially automated mobile platform 200, such as a robot or a drone, for example.

In a seventh step S7, recipient 400 is authenticated by deliverer 120, 200, that is, identified as a legitimate recipient 400, if the transmitted plain text matches the message. Subsequently, deliverer 120, 200 may hand over for example the product to the authentication recipient 400.

What is claimed is:

1. A method of authentication for delivery of a product to a recipient, comprising the following steps:
   generating, by a customer, a public cryptographic key associated with the customer and a private cryptographic key associated with the customer, the generating being in accordance with an asymmetrical encryption;
   transmitting, by the customer, the public cryptographic key to a deliverer;
   generating, by the deliverer, a message encrypted using the public cryptographic key the deliverer had received from the customer;
   transmitting the encrypted message to the recipient for authentication;
   generating a plain text of the encrypted message by the recipient by using the private cryptographic key associated with the customer to decrypt the encrypted message the customer received from the deliverer;
   transmitting the plain text to the deliverer; and
   authenticating the recipient, by the deliverer, based on the transmitted plain text matching the message.

2. The method as recited in claim 1, wherein the deliverer is a first at least partially automated mobile platform.

3. The method as recited in claim 1, wherein the recipient is a person or an automated receiving station.

4. The method as recited in claim 2, wherein the authentication occurs in fully automatic fashion between the first at least partially automated mobile platform as the deliverer and a second at least partially automated platform as the recipient.

5. The method as recited in claim 1, wherein the recipient monitors the deliverer at a delivery location by remote transmission in order to perform the authentication.

6. The method as recited in claim 1, wherein the transmission of the encrypted message and/or of the plain text occurs via a wireless communication method.

7. The method as recited in claim 1, wherein the message is a hash value and/or a random value.

8. The method as recited in claim 1, wherein the transmission of the encrypted message occurs prior to a handover of the product to the recipient.

9. The method as recited in claim 1, wherein the public key and the private key are generated using a data processing system.

10. The method as recited in claim 1, wherein the plain text of the encrypted message is generated using a mobile data processing device.

11. The method as recited in claim 1, wherein a method for the asymmetrical encryption is negotiated between the customer and the deliverer.

12. The method as recited in claim 1, wherein for authentication, a plurality of different public keys is transmitted to the deliverer and the authentication occurs by way of an encrypted message that was encrypted using one of the plurality of public keys.

13. The method as recited in claim 1, wherein the asymmetrical encryption is generated at an equivalent security level of a 128 bit symmetrical key length.

14. The method as recited in claim 1, wherein the method is used for authentication prior to the delivery of the product via an at least partially automated platform.

* * * * *